(12) United States Patent
Chen et al.

(10) Patent No.: US 12,507,121 B2
(45) Date of Patent: Dec. 23, 2025

(54) METHODS AND APPARATUS FOR NETWORK LOAD BALANCING OPTIMIZATION

(71) Applicant: Samsung Electronics Co., Ltd., Suwon-si (KR)

(72) Inventors: Hao Chen, Allen, TX (US); Zhou Zhou, Allen, TX (US); Yan Xin, Princeton, NJ (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 17/129,764

(22) Filed: Dec. 21, 2020

(65) Prior Publication Data

US 2021/0360474 A1 Nov. 18, 2021

Related U.S. Application Data

(60) Provisional application No. 63/025,650, filed on May 15, 2020.

(51) Int. Cl.
*H04W 28/08* (2023.01)
*G06N 3/045* (2023.01)
(Continued)

(52) U.S. Cl.
CPC ........ *H04W 28/0942* (2020.05); *G06N 3/045* (2023.01); *G06N 20/00* (2019.01);
(Continued)

(58) Field of Classification Search
None
See application file for complete search history.

(56) References Cited

U.S. PATENT DOCUMENTS 9,432,880 B2 8/2016 Zhang et al.
9,490,534 B1 11/2016 Marupaduga et al.
(Continued)

FOREIGN PATENT DOCUMENTS

WO 2019170391 A1 9/2019
WO 2019236865 A1 12/2019
WO 2020021504 A1 1/2020

OTHER PUBLICATIONS

International Search Report of the International Searching Authority dated Aug. 20, 2021 in connection with International Application No. PCT/KR2021/005707, 3 pages.
(Continued)

*Primary Examiner* — Chirag G Shah
*Assistant Examiner* — Suk Jin Kang

(57) ABSTRACT

A method for performing mobility load balancing includes receiving, at a server, current load data for a plurality of cells of a wireless communication network, selecting, from the plurality of cells, a target cell (s), wherein a value of the current load data for the target cell exceeds a first predefined threshold, and selecting, from a neighbor cell list corresponding to the target cell, a set of neighboring cells for the target cell. The method further includes calculating, a value of at least one utilization parameter for the target cell, determining, a CIO value and an E-tilt value for the target cell based on the value of the at least one utilization parameter for the target cell and configuring one or more physical layer parameters of the target cell based on the determined CIO and E-tilt values for the target cell.

20 Claims, 11 Drawing Sheets

(51) Int. Cl.
*G06N 20/00* (2019.01)
*H04W 28/02* (2009.01)
*H04W 88/08* (2009.01)

(52) U.S. Cl.
CPC ....... *H04W 28/0226* (2013.01); *H04W 28/08* (2013.01); *H04W 88/085* (2013.01)

(56) References Cited

U.S. PATENT DOCUMENTS

| | | | |
|---|---|---|---|
| 10,397,831 B1* | 8/2019 | Kim | H04W 28/085 |
| 10,772,023 B2* | 9/2020 | Kapoulas | H04W 36/30 |
| 2010/0075682 A1* | 3/2010 | del Rio-Romero | H04W 28/08 |
| | | | 455/439 |
| 2013/0252620 A1* | 9/2013 | Kobayashi | H04W 52/325 |
| | | | 455/446 |
| 2013/0316709 A1* | 11/2013 | Watanabe | H04W 24/02 |
| | | | 455/435.2 |
| 2014/0135015 A1* | 5/2014 | Liu | H04W 36/22 |
| | | | 455/436 |
| 2015/0011198 A1* | 1/2015 | Wellington | H04W 24/02 |
| | | | 455/418 |
| 2015/0031360 A1 | 1/2015 | Choi et al. | |
| 2015/0092751 A1* | 4/2015 | Vargas Bautista | |
| | | | H04W 28/0815 |
| | | | 370/331 |
| 2015/0189550 A1* | 7/2015 | Harrang | H04W 28/0812 |
| | | | 455/405 |
| 2015/0304889 A1* | 10/2015 | Qian | H04W 72/569 |
| | | | 370/235 |
| 2015/0358883 A1* | 12/2015 | Axelsson | H04W 28/0808 |
| | | | 370/252 |
| 2016/0150442 A1* | 5/2016 | Kwan | H04W 24/08 |
| | | | 455/453 |
| 2016/0157252 A1* | 6/2016 | Lu | H04W 24/02 |
| | | | 370/329 |
| 2016/0165462 A1* | 6/2016 | Tan | H04W 16/10 |
| | | | 370/254 |
| 2016/0165485 A1* | 6/2016 | Kwan | H04W 28/0861 |
| | | | 455/453 |
| 2016/0174125 A1* | 6/2016 | Kobayashi | H04W 36/22 |
| | | | 370/332 |
| 2016/0277965 A1* | 9/2016 | Durowoju | H04W 28/0808 |
| 2016/0302131 A1* | 10/2016 | Munier | H04W 36/22 |
| 2017/0134984 A1* | 5/2017 | Gillblad | H04W 36/00837 |
| 2017/0201909 A1 | 7/2017 | Kobayashi et al. | |
| 2017/0359748 A1* | 12/2017 | Fehske | H04W 24/02 |
| 2018/0167843 A1* | 6/2018 | Dribinski | H04L 43/16 |
| 2018/0343599 A1* | 11/2018 | Munier | H04W 24/10 |
| 2019/0014487 A1* | 1/2019 | Yang | G06N 3/04 |
| 2019/0068443 A1* | 2/2019 | Li | H04L 41/0823 |
| 2019/0357059 A1 | 11/2019 | Frenger et al. | |
| 2020/0045603 A1* | 2/2020 | Wang | H04W 28/0205 |
| 2020/0059841 A1* | 2/2020 | Zhang | H04W 36/0085 |
| 2020/0178132 A1* | 6/2020 | Niu | H04W 28/0958 |
| 2020/0314683 A1* | 10/2020 | Imran | H04W 76/15 |
| 2021/0045007 A1* | 2/2021 | Stawiarski | H04W 36/00837 |
| 2021/0051519 A1* | 2/2021 | Bedekar | H04W 28/085 |
| 2021/0112454 A1* | 4/2021 | Tian | H04W 28/0808 |
| 2021/0219204 A1* | 7/2021 | Shi | H04W 36/08 |
| 2021/0282062 A1* | 9/2021 | Wang | H04L 43/0888 |
| 2021/0360713 A1* | 11/2021 | Shuai | H04W 28/0284 |
| 2021/0385718 A1* | 12/2021 | Xie | H04W 36/08 |
| 2022/0103248 A1* | 3/2022 | Stephenne | H04W 16/28 |
| 2022/0159525 A1* | 5/2022 | Chou | H04W 24/02 |
| 2022/0248237 A1* | 8/2022 | Hu | H04W 16/24 |
| 2022/0256358 A1* | 8/2022 | Tosyali | H04W 16/28 |
| 2022/0264330 A1* | 8/2022 | Xie | H04L 41/16 |
| 2023/0132975 A1* | 5/2023 | Futaki | H04L 5/001 |
| | | | 370/254 |
| 2023/0239784 A1* | 7/2023 | Zhang | H04W 52/0206 |
| | | | 370/318 |

OTHER PUBLICATIONS

3GPP TR 37.816 V16.0.0 (Jul. 2019), Technical Report, 3rd Generation Partnership Project; Technical Specification Group Radio Access Network; Study on RAN-centric data collection and utilization for LTE and NR (Release 16), Jul. 2019, 35 pages.

Extended European Search Report issued Jul. 6, 2023 regarding Application No. 21802955.1, 16 pages.

* cited by examiner

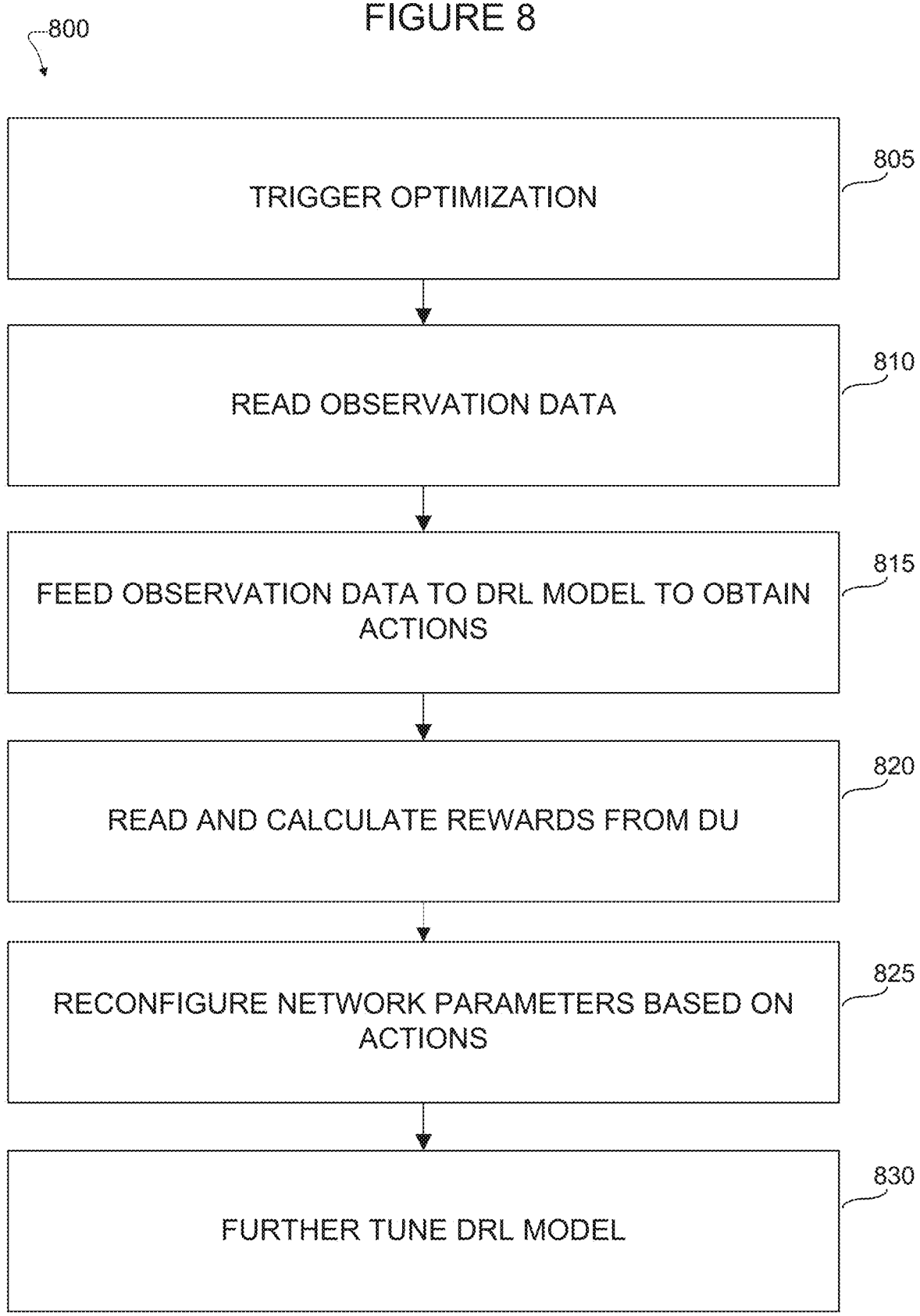

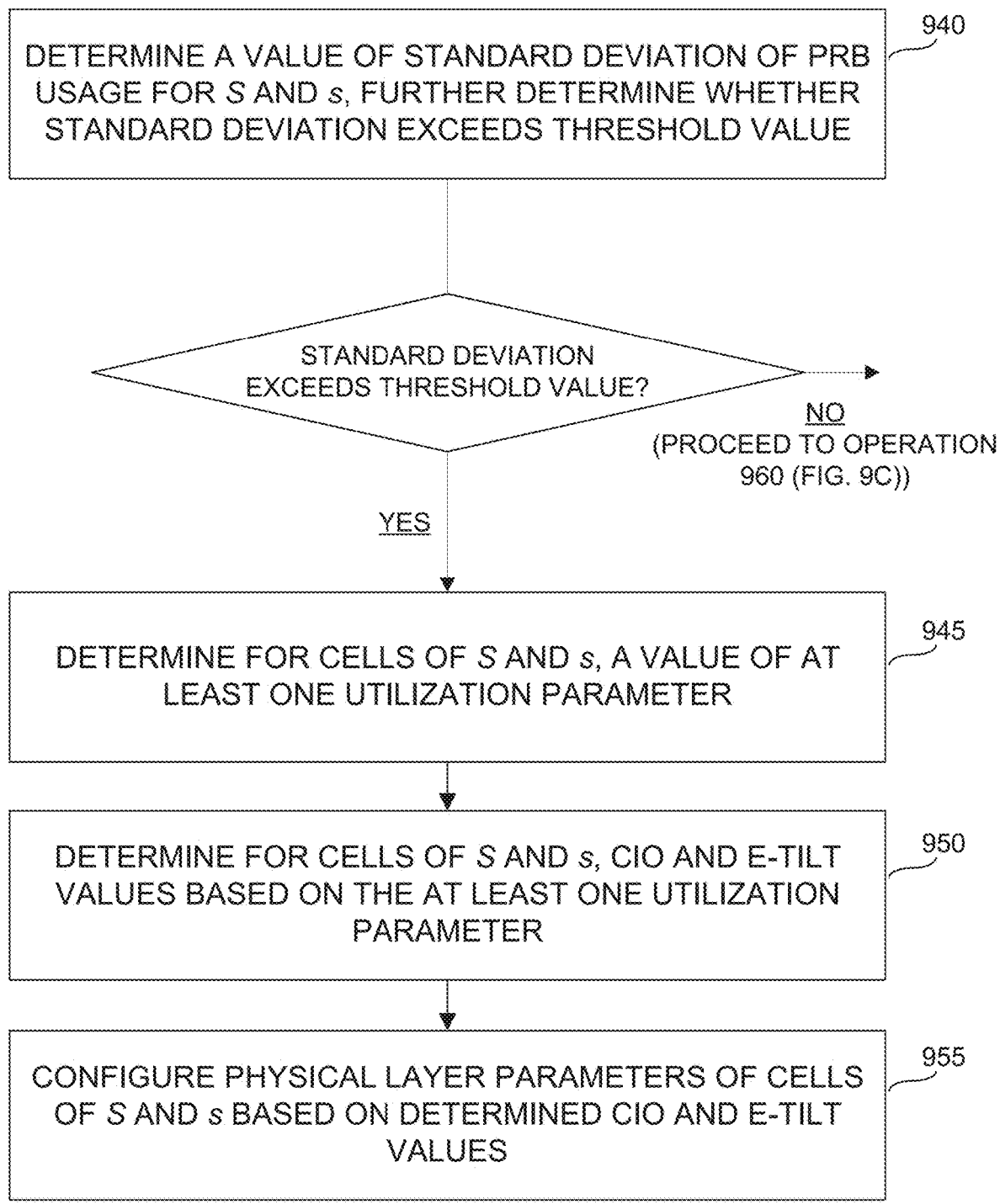

METHODS AND APPARATUS FOR NETWORK LOAD BALANCING OPTIMIZATION

CROSS-REFERENCE TO RELATED APPLICATION AND CLAIM OF PRIORITY

This application claims priority under 35 U.S.C. § 119(e) to U.S. Provisional Patent Application No. 63/025,650 filed on May 15, 2020. The above-identified provisional patent application is hereby incorporated by reference in its entirety.

TECHNICAL FIELD

This disclosure relates generally to wireless communication networks. More specifically, this disclosure relates to methods and apparatus for network load balancing optimization.

BACKGROUND

While advances in wireless communication technologies, including the advent of 5G wireless technologies have greatly expanded the potential throughput of wireless communication systems, realization of these potential throughput gains requires effective allocation of apparatus to coverage areas of access points of networks. Even state-of-the-art eNBs can variously be over-subscribed (for example, with too many devices attempting to communicate through an eNB) or underutilized (for example, an eNB utilizing only a small fraction of its potential connectivity). Both of these situations can result in inefficient, sub-optimal network performance. Thus, the pursuit of optimum load balancing between cells of a wireless network remains a source of technical challenges and opportunities for improvement in the art.

SUMMARY

This disclosure provides methods and apparatus for network load balancing optimization.

In one embodiment, a method for performing mobility load balancing includes receiving, at a server, current load data for a plurality of cells of a wireless communication network, selecting, by the server, from the plurality of cells, a target cell (s), wherein a value of the current load data for the target cell exceeds a first predefined threshold, and selecting, by the server, from a neighbor cell list corresponding to the target cell, a set of neighboring cells for the target cell. The method further includes calculating, by the server, a value of at least one utilization parameter for the target cell, determining, by the server, a cell individual offset (CIO) value and an electrical tilt (E-tilt) value for the target cell based on the value of the at least one utilization parameter for the target cell and configuring, one or more physical layer parameters of the target cell based on the determined CIO and E-tilt values for the target cell. The value of the at least one utilization parameter for the target cell comprises a plurality of values of a physical resource block (PRB) usage of the target cell and the selected neighboring cells.

In another embodiment, a server includes a processor and a network interface. The network interface is configured to receive current load data for a plurality of cells of a wireless communication network. The processor is configured to select, from the plurality of cells, a target cell (s), wherein a value of the current load data for the target cell exceeds a first predefined threshold, select, from a neighbor cell list corresponding to the target cell, a set of neighboring cells for the target cell, calculate, a value of at least one utilization parameter for the target cell, determine, a CIO value and an E-tilt value for the target cell based on the value of the at least one utilization parameter for the target cell, and configure one or more physical layer parameters of the target cell based on the determined CIO and E-tilt values for the target cell. The value of the at least one utilization parameter for the target cell includes a plurality of values of a PRB usage of the target cell and the selected neighboring cells.

In another embodiment, a non-transitory computer-readable medium includes program code, which when executed by a processor, causes a server to receive, via a network interface of the server, current load data for a plurality of cells of a wireless communication network, select, from the plurality of cells, a target cell (s), wherein a value of the current load data for the target cell exceeds a first predefined threshold, select, from a neighbor cell list corresponding to the target cell, a set of neighboring cells for the target cell, calculate, a value of at least one utilization parameter for the target cell, determine, a CIO value and an E-tilt value for the target cell based on the value of the at least one utilization parameter for the target cell, configure one or more physical layer parameters of the target cell based on the determined CIO and E-tilt values for the target cell. The value of the at least one utilization parameter for the target cell includes a plurality of values of a PRB usage of the target cell and the selected neighboring cells.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates operations of a method for performing RF parameter optimization in accordance with an embodiment of this disclosure; and FIGS. 9A-9C illustrate operations of methods for selecting cells for RF parameter optimization and optimizing parameters of the selected cells in accordance with at least one embodiment of this disclosure.

DETAILED DESCRIPTION

FIGS. 1 through 9C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
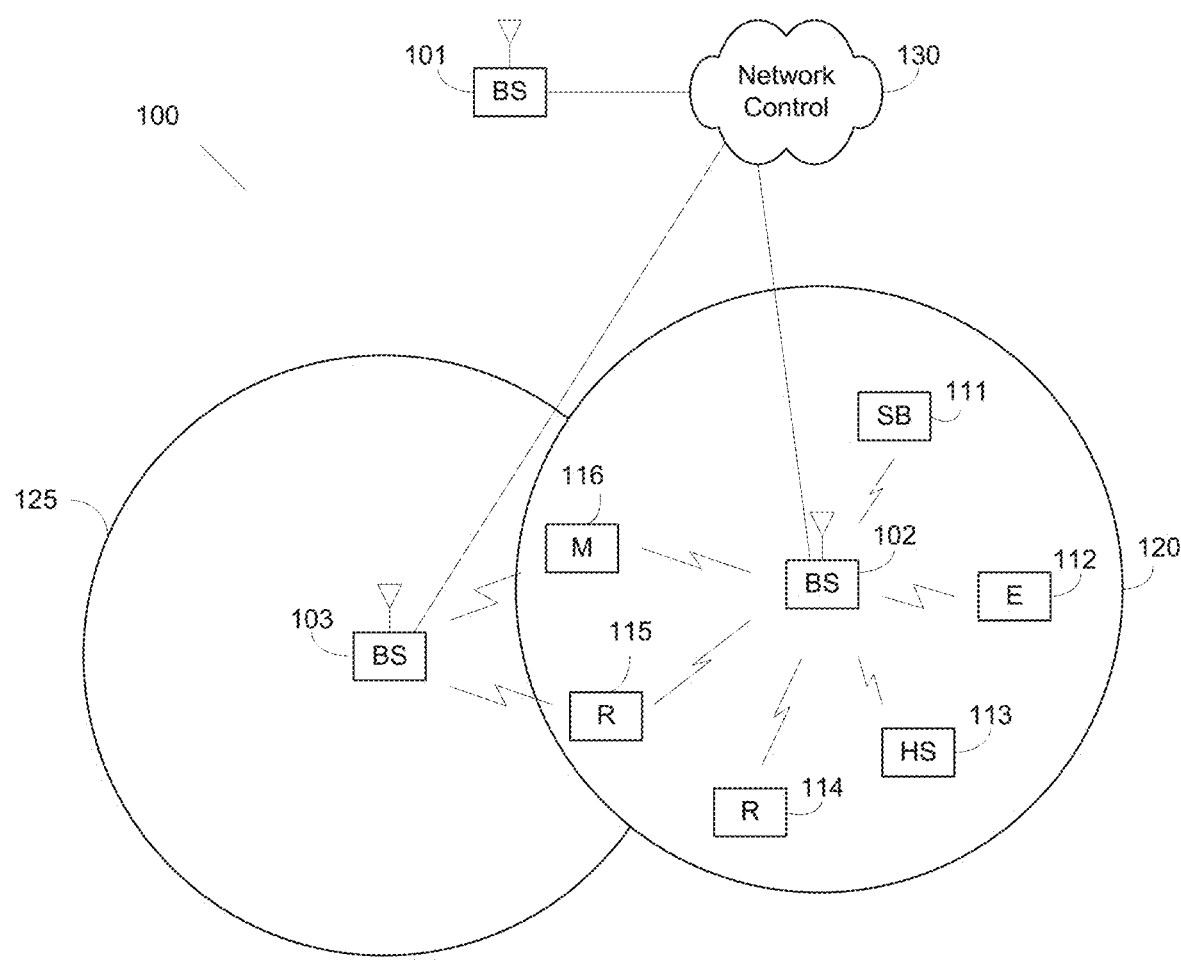
FIG. 1 illustrates an example of a wireless communication network in accordance with an embodiment of this disclosure.

FIG. 1 illustrates an example of part of a network 100 according to this disclosure. The embodiment of the network 100 shown in FIG. 1 is for illustration only. Other embodiments of the network 100 could be used without departing from the scope of this disclosure.

As shown in FIG. 1, the network 100 includes an eNodeB (eNB) 101, an eNB 102, and an eNB 103. The eNB 101 communicates with the eNB 102 and the eNB 103. The eNB 101 also communicates with at least one network control system 130, such as a backend computing system provided by a mobile carrier, which can implement load balancing between the eNBs of network 100.

The eNB 102 provides wireless connectivity (for example, through wireless protocols, such as 5G or LTE) access to the network 100 for a first plurality of user equipments (UEs) within a coverage area 120 of the eNB 102. The first plurality of UEs includes a UE 111, which may be located in a small business; a UE 112, which may be located in an enterprise (E); a UE 113; a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless connectivity for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, Wi-Fi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless connectivity to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions. Further, according to certain embodiments, the size and position of coverage areas 120 and 125 can be controlled through the adjustment of operating parameters of the physical hardware of the eNBs in communication with the UEs, such that a given UE occupying a location in the coverage areas of both a first eNB and a second eNB can be handed off from the first eNB to the second eNB to help balance the communication load on the network across the available eNBs.

Although FIG. 1 illustrates one example of a network 100, various changes may be made to FIG. 1. For example, the wireless network 100 could include any number of eNBs and any number of UEs in any suitable arrangement. Also, the eNB 101 could communicate directly with any number of UEs. Further, the eNB 101, 102, and/or 103 could provide access to other or additional external networks, such as external telephone networks or other types of data networks.

It should further be noted that the example of FIG. 1 is not necessarily tied to any particular generation of wireless communication protocols and the associated technologies for implementing such protocols. To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
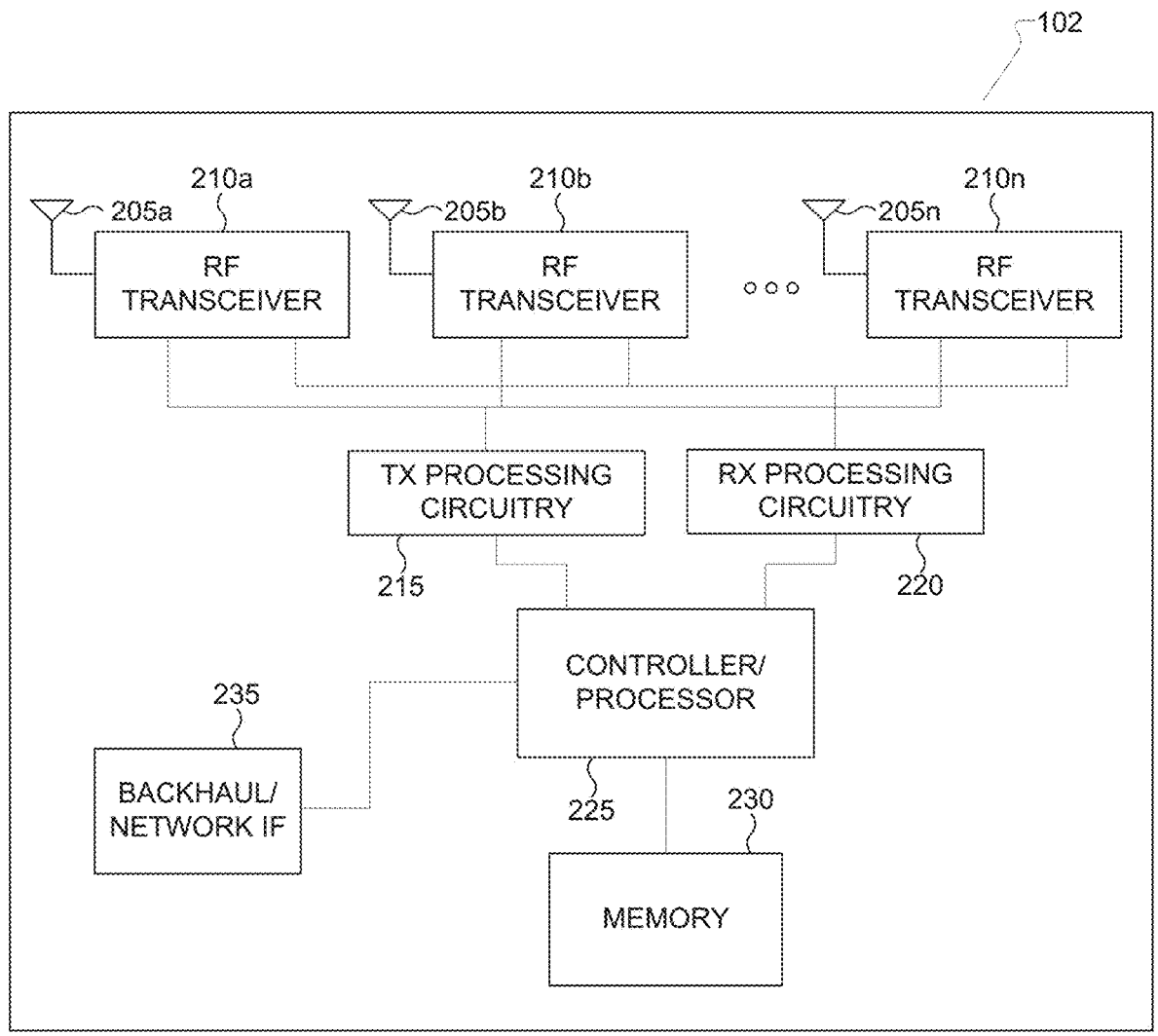
FIG. 2 illustrates an example of an evolved Node B ("eNB") in accordance with an embodiment of this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. According to certain embodiments, the RF signals transmitted via antennas 205a-205n are encoded such that data to be transmitted, and the associated signaling are apportioned to time/frequency resource blocks ("RBs"). In this illustrative example, the throughput of eNB 102 (and other eNBs of a network) is limited in part by the available number of resource blocks. When more UEs or other apparatus attempt to communicate through eNB 102, eNB 102 must apportion increasingly fewer RBs to each device's communications, which, as the number of supported devices increases, results in a decrease in communication performance. Thus, apportioning UEs and other wireless devices across eNBs in a way that balances the load and avoids wide variations in RB usage across eNBs of a network is of significant importance to ensuring fast, reliable network operation.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
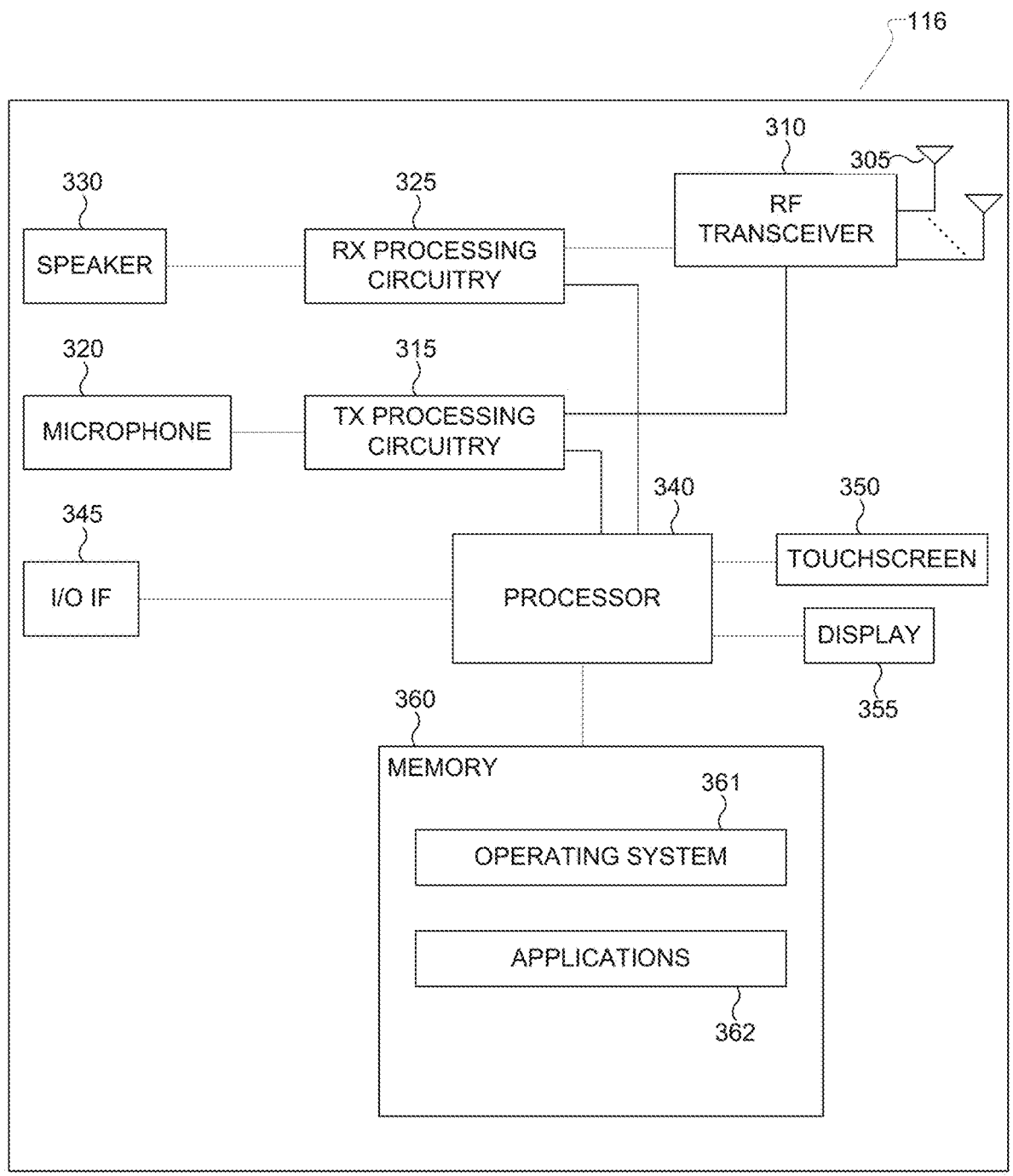
FIG. 3 illustrates an example of a user equipment ("UE") in accordance with an embodiment of this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. According to certain embodiments, TX processing circuitry and RX processing circuitry encode and decode data and signaling for wireless in resource blocks ("RBs" or physical resource blocks "PRBs") which are transmitted and received by, inter alia, the eNBs of a wireless network (for example, wireless network 100 in FIG. 1). Put differently, TX processing circuitry 215 and RX processing circuitry 220 generate and receive RBs which contribute to a measured load at an eNB.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
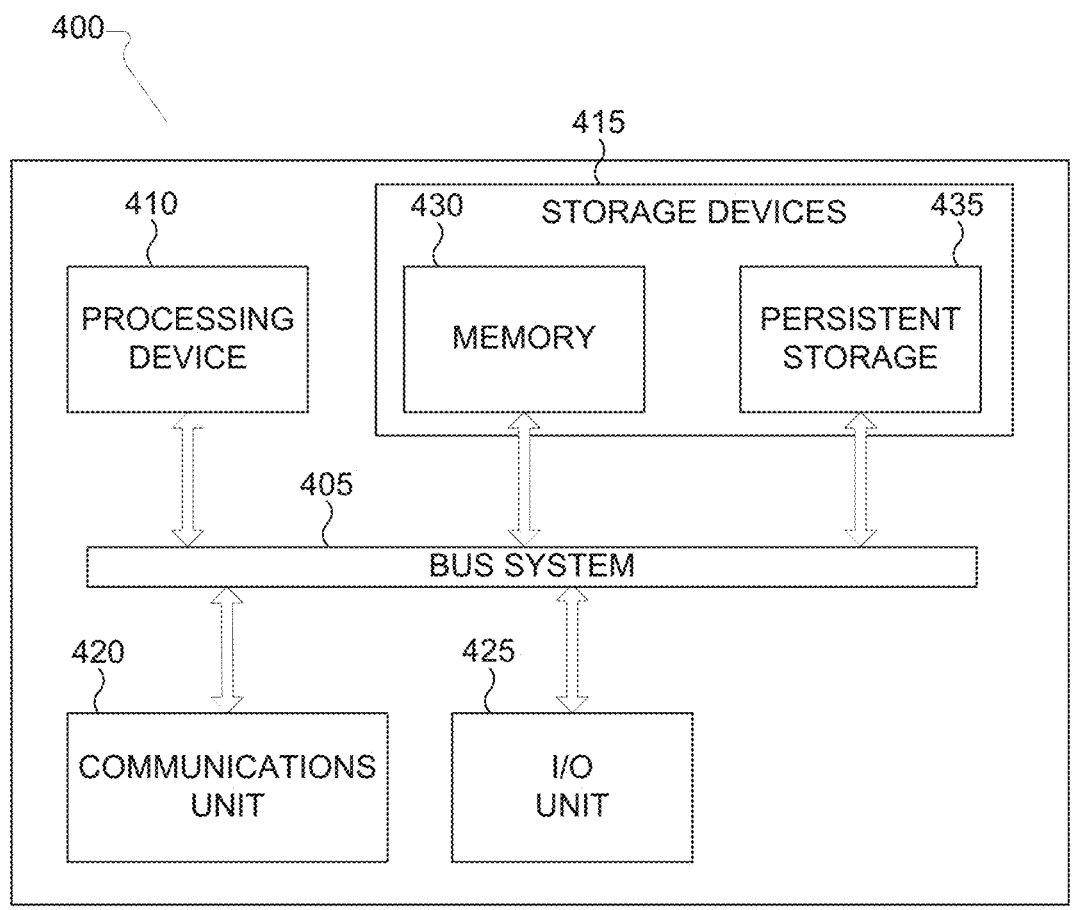
FIG. 4 illustrates an example of a server in accordance with an embodiment of this disclosure.

FIG. 4 illustrates an example of a server 400 according to certain embodiments of this disclosure.

As shown in FIG. 4, the server 400 includes a bus system 405, which supports communication between at least one processing device 410, at least one storage device 415, at least one communications unit 420, and at least one input/output (I/O) unit 425.

The processing device 410 executes instructions that may be loaded into a memory 430. The processing device 410 may include any suitable number(s) and type(s) of processors or other devices in any suitable arrangement. Example types of processing devices 410 include microprocessors, microcontrollers, digital signal processors, field programmable gate arrays, application specific integrated circuits, and discreet circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a ready only memory, hard drive, Flash memory, or optical disc.

The communications unit 420 supports communications with other systems or devices. For example, the communications unit 420 could include a network interface card or a wireless transceiver facilitating communications over the network 402. The communications unit 420 may support communications through any suitable physical or wireless communication link(s). According to certain embodiments, communications unit 420 comprises a network interface or other communications interface through which server 400 can receive status data from hardware (for example, eNBs, digital units ("DUs"), and remote radio heads ("RRHs")) of a wireless communication network, and also transmit commands for adjusting one or more operational parameters (for example, power level, electronic tilt ("E-tilt")) of such hardware.

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Figure 5:
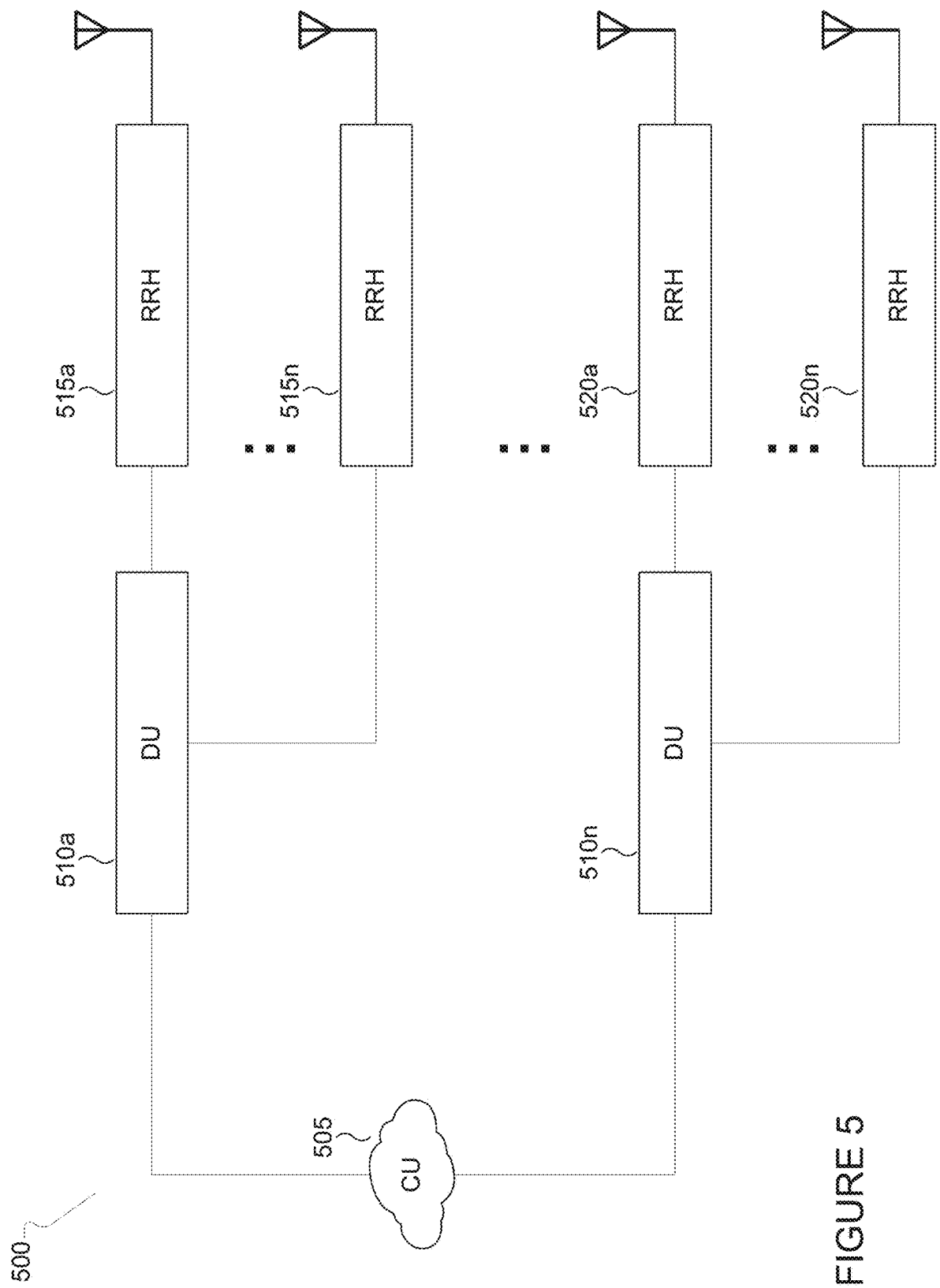
FIG. 5 illustrates an example of a network architecture for implementing RF parameter optimization in accordance with an embodiment of this disclosure.

FIG. 5 illustrates an example of radio access network ("RAN") architecture 500 for implementing artificial intelligence (AI) based network parameter optimization according to various embodiments of this disclosure.

Referring to the non-limiting example of FIG. 5, RAN architecture 500 comprises a central unit ("CU") 505. According to some embodiments, CU is a server or other logical node of a computing network that operates at the core of RAN architecture 500. CU 505 handles high-level functions of the network, including, without limitation, managing radio access network sharing between a plurality of eNBs of the network, mobility control, and session management.

As shown in FIG. 5, CU 505 is communicatively connected to send and receive data over a network, via a network interface of the CU (for example, communications unit 420 in FIG. 4) to a plurality of digital units ("DUs") 510a through 510n. In this explanatory example, DUs 510a-510n are base stations or eNBs (for example, eNB 102 in FIG. 2), each of which provides wireless connectivity to one or more user equipment (for example, UE 116 in FIG. 3).

Further, as shown in the explanatory example of FIG. 5, each of DUs 510a-510n comprises, or is, at a minimum, communicatively connected to one or more remote radio heads (RRH), 515a-515n and 520a-520n. According to various embodiments, each RRH provides a powered transmission signal to one or more antennas, creating a zone of radio coverage—also known as a cell, within which UEs can receive signals from the DU, and transmit data to the DU over radio beams established between the RRH and the UE. Each of RRHs 515a-515n and 520a-520n may control one or more operational parameters determining the effective area of radio coverage provided by a DU.

Figure 6A:
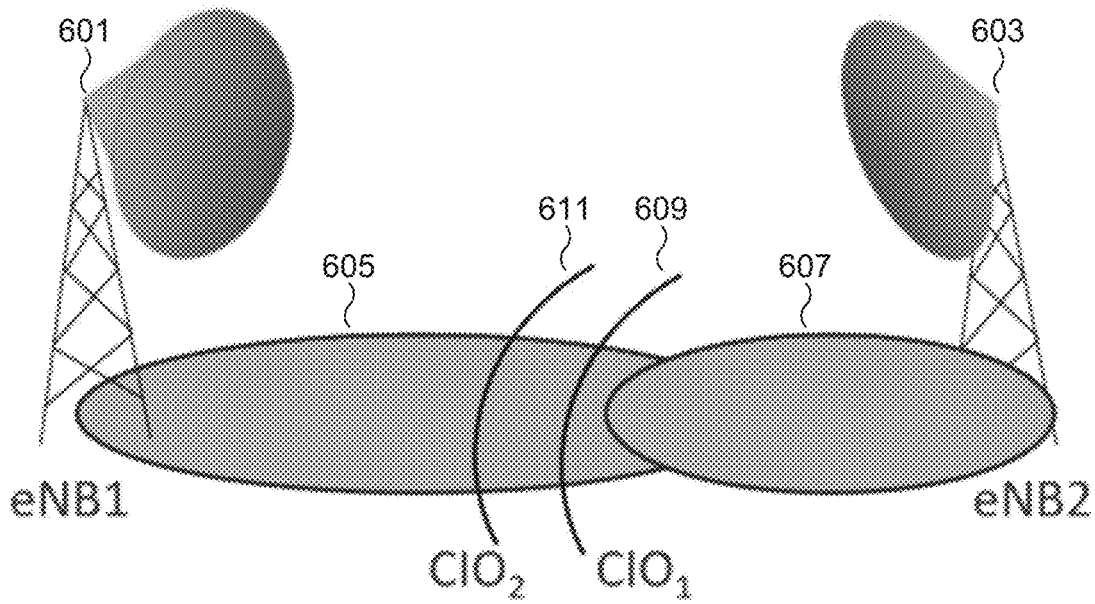
FIGS. 6A and 6B illustrate two example of RF parameters which can be optimized to facilitate load balancing in accordance with an embodiment of this disclosure.
Figure 6B:
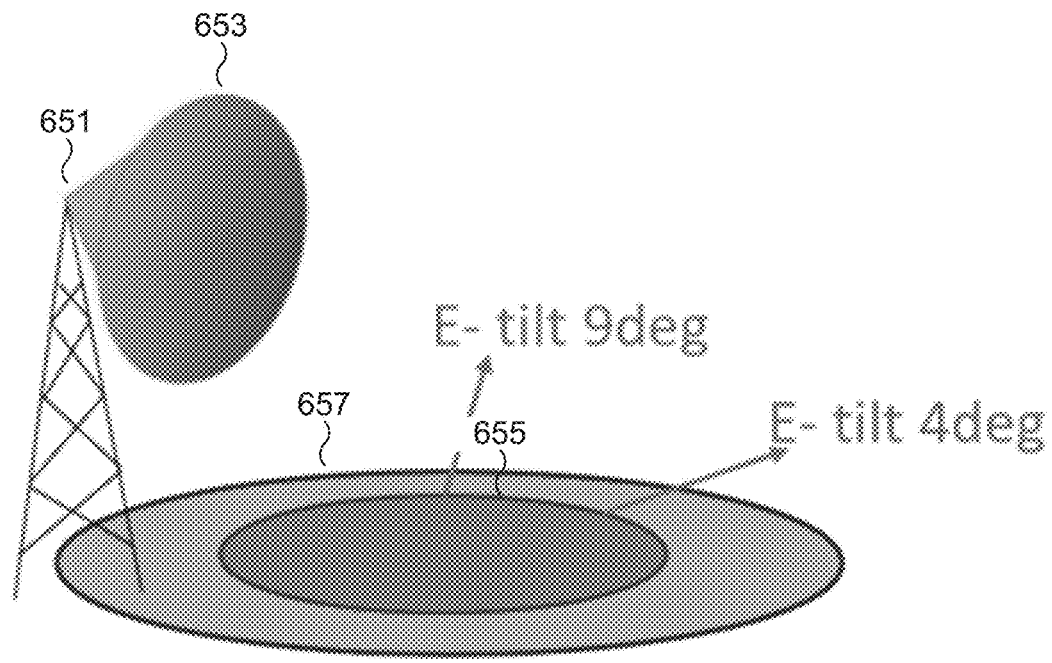

FIGS. 6A and 6B illustrate two examples of operational parameters which can be modulated through one or more RRHs to change the effective radio coverage area (or "cell") of a DU. According to certain embodiments of this disclosure, changing the radio coverage areas of DUs of a wireless network can balance the load across the DUs of a network, such that each node, or DU of the network can provide a roughly equivalent number of resource blocks to each connected device.

Referring to the non-limiting example of FIG. 6A, this example illustrates how cell individual offset ("CIO") can be modulated to change the effective coverage area of an eNB. According to certain embodiments, the effective coverage area of an eNB is defined as an area within which the received power of signals received from the eNB at a UE relative to the received power of signals received from one or more neighboring eNBs at the UE satisfies a condition for not transferring, or handing over, the UE to a neighboring eNB. As the conditions for transferring a UE from one eNB are controlled by operator-adjusted parameters, the effective coverage area of a cell is a tunable parameter. CIO is one of at least two parameters for controlling the handover point of an eNB, and by implication, the effective coverage area of the eNB.

In this explanatory example, a first eNB 601 and a second eNB 603 are shown in the figure. A first oval 605, shows a radio coverage area of first eNB 601, and a second oval 607 shows a radio coverage area of second eNB 603. According to certain embodiments, the boundaries of the respective coverage areas of first eNB 601 and second eNB 603 are defined according to equation (1) below, which sets forth the criteria for a handover, or A3 event, wherein a UE moves from the coverage zone of a first eNB to a second eNB.

$$P_j^t - P_i^t > O_{ij}^t + H_i \quad (1)$$

Where $P_i^t$ is a measure of a value of the receiving power of a serving cell and $P_j^t$ is a measure of a value of the receiving power of a neighboring cell. $O_{ij}^t$ is the value of a CIO between cell i and cell j, and $H_i$ is the value of a hysteresis constant to avoid frequent handovers between cells i and j. When the difference in received power at a UE from cell j and cell i exceeds the value of the CIO plus the hysteresis constant, the UE is transferred from cell i to cell j.

As the received power at a UE decreases in proportion to distance from the eNB, adjusting the value of CIO, the distance from the eNB where the conditions for handover are met can change. As shown in FIG. 6A, a first CIO value results in a first effective coverage area 609 and a second CIO value results in a second effective coverage area 611.

FIG. 6B illustrates how electronic tilt ("E-tilt") is a further parameter by which the effective coverage area of an eNB, and, by implication, the load on an eNB can be tuned according to some embodiments of this disclosure.

The antennae of certain eNBs are provided with a set of controllable mechanical actuators, which can perform azimuthal adjustments of the antennae, thereby controlling the extent to which RF beams generated by the eNB are trained above, at, or below the horizon. By increasing the value of an E-tilt angle (e.g., the extent to which RF beams are trained at an angle above or below the horizon), it is possible to concentrate the broadcast power of the eNB over a smaller coverage area. Similarly, by decreasing the value of the E-tilt angle (e.g., training the RF down to, or below, the horizon), it is possible to distribute the broadcast power of the eNB across a larger coverage area.

Referring to the explanatory example of FIG. 6B, an eNB 651 (for example, eNB 102 in FIG. 2) with a multi-antenna array projects lobe-shaped beams (including lobe 653). As shown in the figure, by setting the electronic tilt at a first value of 4 degrees above the horizon, radio beams of lobe 653 cover a first coverage area 655. By increasing the E-tilt value to 9 degrees above the horizon, radio beams of lobe 653 cover a second, larger coverage area 657.

Figure 7:
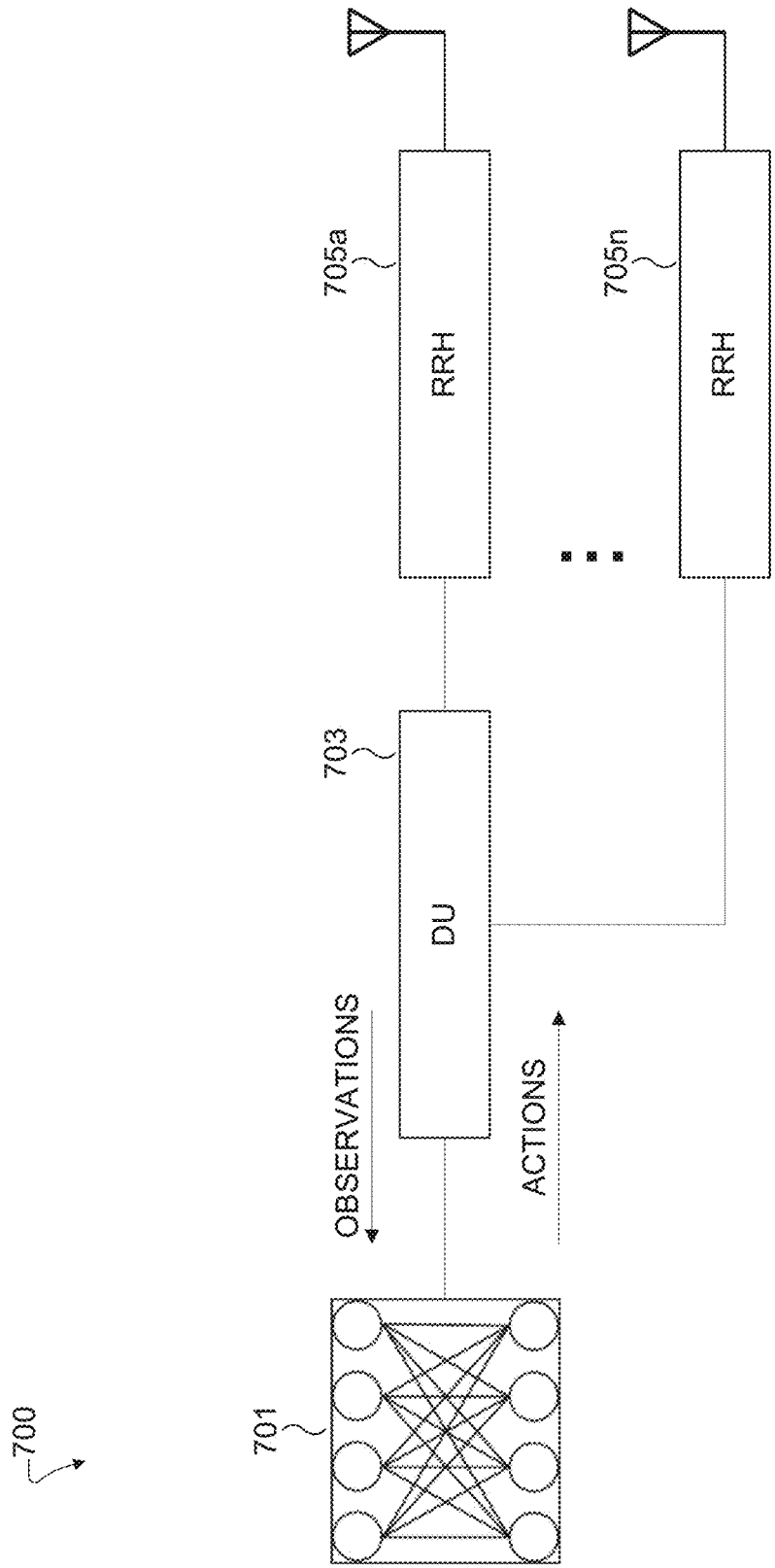
FIG. 7 illustrates an example of a network architecture for implementing AI assisted RF parameter optimization in accordance with an embodiment of this disclosure.

FIG. 7 illustrates an example of an architecture 700 for implementing artificial-intelligence (AI) based network parameter optimization according to various embodiments of this disclosure.

Referring to the non-limiting example of FIG. 7, architecture 700 comprises a feedback/decision loop between the physical componentry of an eNB and one or more computing platforms 701 (for example, CU 505 in FIG. 5 or server 400 in FIG. 4) implementing a deep reinforced learning model which receives, as inputs, observation data from RF hardware (for example, the DU and RRH) of an eNB, and outputs actions, comprising values of parameters (for example, CIO and E-tilt) of the RF hardware.

As shown in the illustrative example of FIG. 7, architecture 700 further comprises at least one digital unit 703 ("DU") (for example, DU 510a in FIG. 5) communicatively connected to computing platform 701. DU 703 is, in addition to providing controls to one or more remote radio heads 705a-705n, configured to obtain observation data on the current operational status of the eNB and provide same to computing platform 701. Examples of observation data which can be obtained by DU 703 and transmitted to computing platform 701 include, without limitation, current values of physical resource block ("PRB") usage, a ratio of edge users, and metrics of throughput through the DU. As used in this disclosure, the ratio of edge users comprises a ratio of users (i.e., UE and other apparatus currently attached to, and communicating through the eNB), who could, if one or more network parameters, such as CIO were changed, be handed off to another eNB, relative to the total number of users of the cell. In the explanatory example of FIG. 7, DU 703 is further configured to receive actions from computing platform 701 and control one or more RRHs 705a-705n according to the received actions.

In some embodiments, architecture 700 comprises one or more remote radio heads (RRHs) 705a-705n, which generate and receive RF signals through a plurality of antennas. The operation of RRHs 705a-705n, and in particular, the zone of radio coverage provided by an eNB can be varied according to RF parameters (for example CIO and E-tilt) of RRH's 705a-705n.

FIG. 8 illustrates operations of an example method 800 for performing network parameter optimization according to various embodiments of this disclosure. The operations described with reference to FIG. 8 may be performed in any suitable network architecture (for example, architecture 700 in FIG. 7) comprising a computing platform capable of implementing a DRL model which is communicatively connected to the hardware of an eNB.

Referring to the non-limiting example of FIG. 8, at operation 805, the parameter optimization process for optimizing RF parameters of one or more eNBs or cells of a wireless network is triggered at the computing platform implementing the DRL model. In some embodiments, the optimization process is triggered based on a clock indicating that the predetermined interval (an hour, or a day) has lapsed since the last iteration of the parameter optimization process. In some embodiments, the optimization process is triggered by other processes managed by the computing platform, such as a determination that a particular eNB or cell of the wireless network is a suitable candidate for parametric optimization.

According to some embodiments, at operation 810, the computing platform (for example, a server) reads observation data provided from, at a minimum, a DU of the eNB whose RF parameters are to be optimized by method 800. Observation data includes, without limitation, values of the PRB usage at the eNB (i.e., what fraction of the available time frequency blocks are being presently used), the ratio of edge users (i.e., users which could, potentially be handed over to neighboring cells to total users), and throughput (for example, the number of bytes of data transmitted and received per second) of the DU. Other indicators of network performance, or the load at each cell may be included in the observation data read at operation 810.

As a further example of observation data read at operation 810, consider a network comprising N cells, where the load across the N cells at a given time t can be expressed as $\rho_1^t, \ldots, \rho_N^t$, and the ratio of edge users at time t can be represented as $E_1^t, \ldots, E_N^t$. Accordingly, for a given time t, the observation information read by the computing platform at operation 810 can be denoted as a value of a state $s_t$ according to equation (2), below:

$$s_t[\bar{\rho}_1^t, \ldots, \bar{\rho}_N^t, E_1^t, \ldots, E_N^t] \in R^{2N} \quad (2)$$

Referring to the explanatory example of FIG. 8, at operation 815, the observation data is fed to one or more deep reinforced learning (DRL) models to obtain a set of actions. In this example, the DRL model comprises a neural network which has been trained on a set of observation data for the network. According to various embodiments, the DRL model receives, as an input, the observation data output at operation 810, and outputs, for one or more actions associated with values of RF parameters, such as E-tilt or CIO, within an action space $a_t$, which can be denoted as:

$$a_t = [O_{ij}^t, T_i^t \mid \forall i, j \in I] \in R^{\frac{N(N-1)}{2}+N} \quad (3)$$

Where $O_{ij}^t \in [O_{min}, O_{max}]$ is CIO between cell i and cell j ($O_{ij}^t = -O_{ji}^t$), and $T_i^t \in \{0, 1, \ldots, 12\}$ is the tilt angle of cell i. Simply put, the DRL model outputs a set of candidate actions for the observation data, and one or more of the candidate actions is selected as providing the RF parameters for reconfiguring one or more eNBs based on expected reward value(s) calculated in the next operation of method 800.

According to various embodiments, at operation 820, the server or other computing platform reads and calculates expected rewards associated with the actions obtained at operation 815. In some embodiments, the calculated expected reward associated with a pairing of a state s and an action a is based on the maximum load over all of the cells, with the object of training the DRL model being to optimize the RF parameters of the cells such that the maximum load over all of the cells is minimized. In such cases, the expected reward value can be expressed according to equation (4), below:

$$r(s_t, a_t) = \left(-\max_{i \in I} \bar{\rho}_i^t\right) \in R \quad (4)$$

In some embodiments, the calculated expected reward associated with a given state s and an action a is based on an aggregate of the maximum load through a cell and throughput through a given cell, with the objective of optimizing RF parameters of the cells such that the aggregate of the maximum load amongst the cells is minimized and the cell throughput is maximized. In such cases, the value of the expected reward r can be expressed according to equation (5), below.

$$r(s_t, a_t) = \left(-w_1 \max_{i \in I} \bar{\rho}_i^t + w_2 \bar{C}^t\right) \in R \quad (5)$$

Where $\bar{C}^t$ is the average cell throughput.

Referring to the non-limiting example of FIG. 8, at operation 825, one or more network parameters, such as E-Tilt or CIO are reconfigured based on the actions and the calculations at performed at operation 820 of the expected rewards associated with the actions. At operation 830, the expected rewards of a previous iteration of operations 805-825 and the observation data obtained at operation 810 are added to a corpus of training data for the DRL model, and the DRL model is further tuned. By repeatedly iterating operations 805-830, the DRL model from which actions associated with observation data are obtained can be progressively trained to optimize certain RF parameters (in this example, E-Tilt and CIO). With sufficient training, embodiments according to the present disclosure can provide significant improvements in throughput without concomitant increases in average maximum load. Table 1 below, reports results from a test implementation of RF tuning according to the methods described with reference to FIG. 8.

TABLE 1

| Tuning parameters | FixedCIO No tuning | DRL (Minimize Load) CIO | DRL (Minimize Load) CIO & Tilt | DRL (Maximize Throughput) CIO | DRL (Maximize Throughput) CIO & Tilt |
|---|---|---|---|---|---|
| Average Maximum Load | 0.98 | 0.87 | 0.78 | 0.97 | 0.98 |
| Average Throughput (Mbps) | 79.35 | 64.86 | 80.89 | 80.21 | 89.04 |

As shown above, testing has shown that training and utilizing a DRL model to tune the CIO and E-Tilt of one or more network nodes can effect significant improvements in the overall performance of a network, as shown by, for example, the 10 Mbs improvement in throughput in a network using a DRL model to tune CIO and E-Tilt, as compared to the same network without any tuning.

Figure 9A:
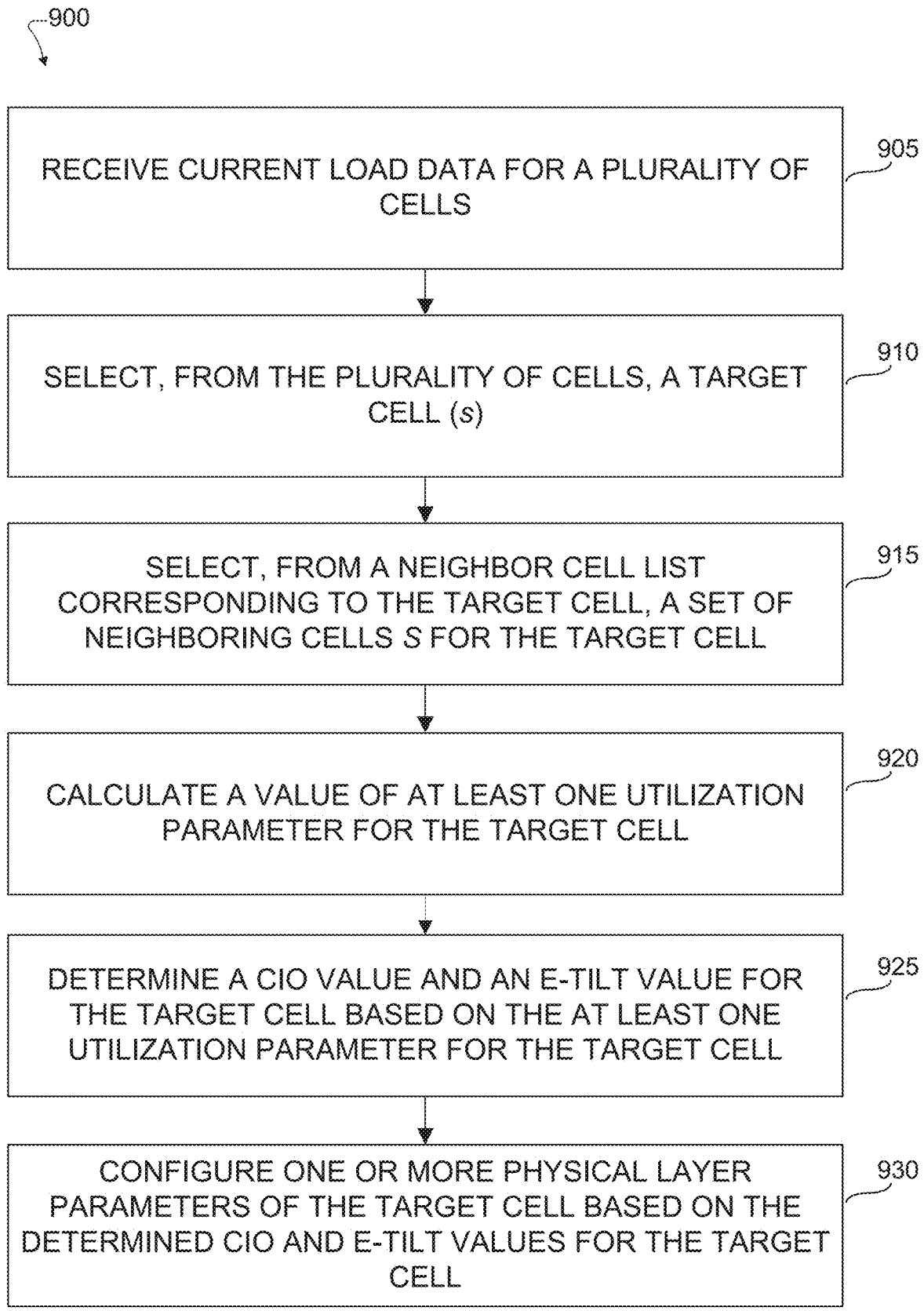
Figure 9C:
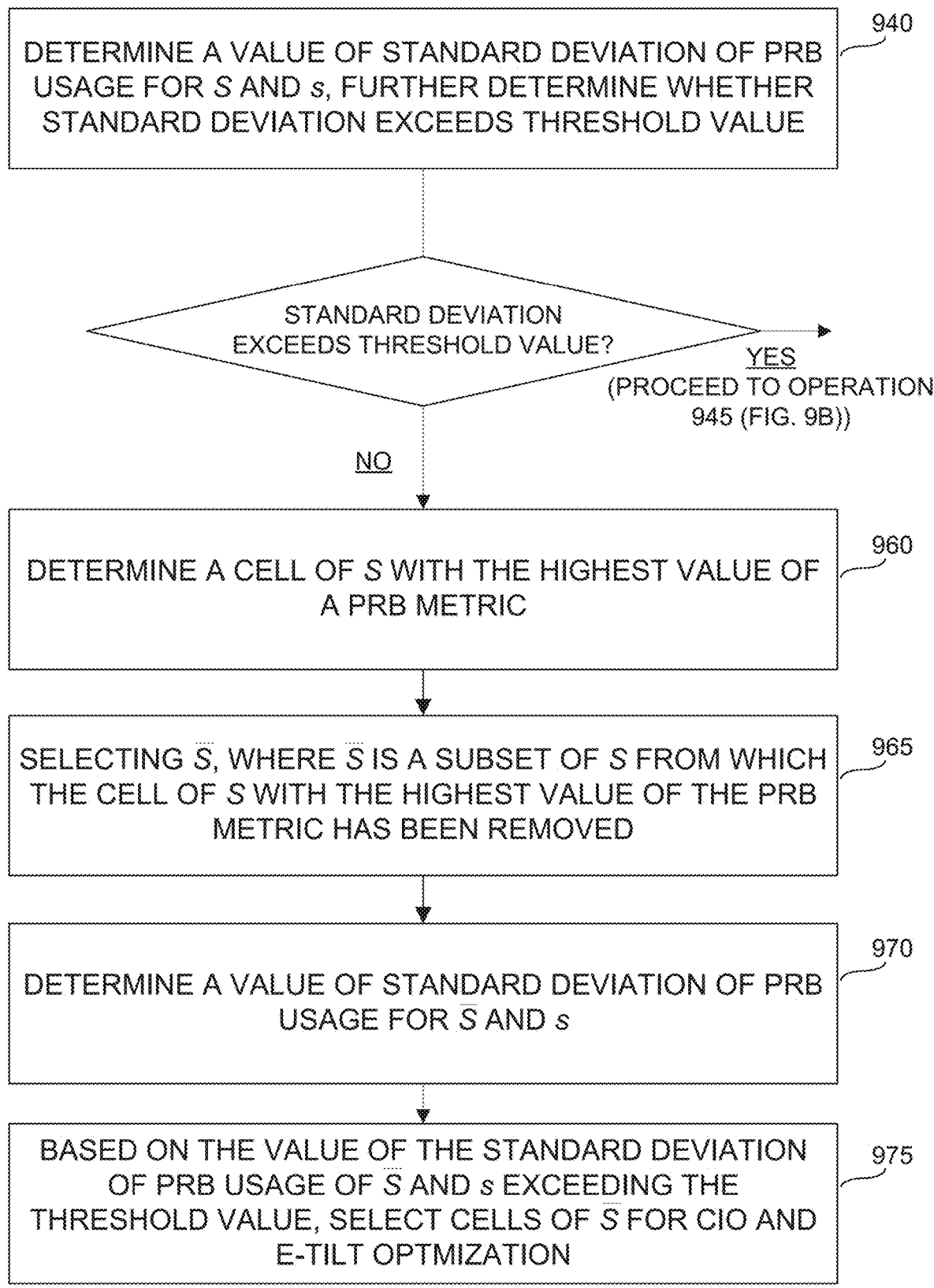

FIGS. 9A through 9C illustrate operations of example methods for selectively optimizing the cells of a wireless network according to various embodiments of this disclosure.

The increased load capacity and connectivity of modern wireless networks has been facilitated in significant part, by an increase in the usage of the RF spectrum at frequencies significantly higher than the 800 MHz frequencies used for previous generations of wireless communication. While these higher frequencies, sometimes referred as "mmWave" frequencies, provide new, previously untapped sources of bandwidth, the physics of wave propagation set the price of this increase in spectrum. Specifically, all other things being equal, higher frequency radio waves dissipate more rapidly over a transmission area than lower frequency radio waves. Again, all other things being equal, an increase in carrier frequencies implies that more eNBs are required to provide coverage over a given area. As the number of eNBs and transceiving nodes in a network increases, the computational load of optimizing RF parameters to balance the load on the network across similarly increases. Accordingly, as the number of eNBs increases, the selection of cells for RF parameter optimization becomes an increasingly thorny technical problem.

FIG. 9A illustrates one example of a method 900 for selecting cells for RF parameter optimization, and optimizing same, according to various embodiments of this disclosure.

As shown in FIG. 9A, at operation 905, a network optimization server (for example, server 400 in FIG. 4), or other backend computing platform controlling aspects of a plurality of cells (for example, CU 505 in FIG. 5), obtains current load data for a plurality of cells of a wireless network. In this illustrative example, the current load data comprises values of PRB usage for each of the cells of the plurality of cells. In some embodiments, operation 905 is triggered by the expiration of a timer (for example, the passage of two hours since the last network optimization operation). In certain embodiments, operation 905 is triggered by the satisfaction of a predetermined condition (for example, the number of devices connected to the network exceeding a threshold number.

As shown in the explanatory example of FIG. 9A, at operation 910, the server selects, from the plurality of cells for which current load data was received at operation 910, a target cell s. According to various embodiments, target cell s comprises one or more cells wherein the value of the current load data (for example, the data received at operation 905) exceeds a first predefined threshold.

According to various embodiments, at operation 915, the server or other computing platform selects, from a neighbor cell list for the target cell, a defined set S of neighboring cells for the target cell. According to various embodiments, the contents of the neighboring cell list may be determined in advance, or comprise the output of a cell selection model which is iteratively trained on data from the network. At operation 920, the server calculates the value of at least one utilization parameter for the target cell, as a target value for a new load through the target cell. Depending on embodiments, the value of the utilization parameter may be determined as an action output by a DRL model (for example, as described with reference to FIG. 8 of this disclosure).

In certain embodiments, the at least one utilization parameter comprises one or more values of a physical resource block (PRB) usage of the target cell. In various embodiments, the at least one utilization parameter comprises a ratio of cell edge equipment.

Referring to the non-limiting example of FIG. 9A, at operation 925, the server determines a CIO value and an E-tilt value for the target cell based on the calculated utilization parameter for the target cell. In some embodiments, the CIO value and E-tilt value may be determined utilizing a DRL model which has been trained on observations of network data, and has been iteratively optimized to determine combinations of E-Tilt and CIO that most efficiently achieve a particular utilization goal. In certain embodiments, the CIO value and E-Tilt values may be separately computed at the server, or obtained from a pre-stored data structure, such as a lookup table.

At operation 930, one or more physical layer parameters of the target cell are configured based on the CIO and E-Tilt values determined at operation 925. In certain embodiments, the server or computing platform which performed operation 925 sends the determined CIO and E-Tilt values to the DU of the cell, which determines control parameters for the RRH and tilt actuator of the antenna of the cell. In various embodiments, the server also determines the physical layer parameters of the target cell and remotely configures the target cell.

FIG. 9B illustrates an example of further operations for determining utilization parameters for RF parameter optimization and configuring cells with optimized RF parameters according to various embodiments of this disclosure. The operations described with reference to FIG. 9B can be performed as part of a loop performed within a larger, or more general method for cell selection and optimization (for example, operations 920-930 of method 900 in FIG. 9A).

As noted elsewhere in this disclosure, as the number of neighboring cells in a network, potentially, so too, does the computational load associated with periodically optimizing RF parameters of cells, as cells increase in number and areas of overlapping coverage, where tuning RF parameters to redistribute network loads becomes possible.

Referring to the illustrative example of FIG. 9B, at operation 940, the server (for example, server 400 in FIG. 4) or equivalent computing platform (for example, CU 505 in FIG. 5), has selected a target cell s based on current PRB data obtained from cells of the network, and has further selected a set of neighbor cells S of the target cell. According to certain embodiments, the set of neighbor cells S of the target cell are selected based on a neighbor cell list (for example, as described with reference to operation 915 in FIG. 9A). At operation 940, a value of σ(S∪s), where σ(S∪s) comprises a measure of a standard deviation of PRB usage for a union of S and s is calculated and compared against a threshold value for σ. In other words, a determination is made of the variation in load (as expressed in terms of PRB usage) between the target cell s and the cells of the set of neighboring cells S. Where the value of σ(S∪s) exceeds the threshold value of σ, indicating a potentially curable imbalance in the distribution of network load across the cells of S and s, certain methods according to this disclosure proceed to operation 945.

According to various embodiments, at operation 945, because the standard deviation in PRB usage across the full set of cells (S∪s) exceeds the threshold value for the standard deviation, the server determines, for each cell of (S∪s), a value of at least one utilization parameter. In certain embodiments, the at least one utilization parameter comprises one or more values of a physical resource block (PRB) usage of the target cell. In various embodiments, the at least one utilization parameter comprises a ratio of cell edge equipment.

As shown in the explanatory example of FIG. 9B, at operation 950, the server determines for cells of the union of S and s, values of CIO and E-Tilt based on the at least one utilization parameter. According to some embodiments, the values of CIO and E-Tilt may be determined by applying the utilization parameter to a DRL model trained on network data, to obtain CIO and E-Tilt values that, based on the training of the model, have provided the greatest rewards in terms of relieving network load. In some embodiments, the CIO and E-Tilt values based on the network utilization parameter are separately calculated or obtained from a lookup table or similar data source.

At operation 955, physical layer parameters of the hardware serving cells of (S∪s) are configured based on the CIO and E-Tilt values determined at operation 950. In certain embodiments, the server or computing platform which performed operation 950 sends the determined CIO and E-Tilt values to the DU of the cell, which determines control parameters for the RRH and tilt actuator of the antenna of the cell. In various embodiments, the server also determines the physical layer parameters of the target cell and remotely configures the target cell.

FIG. 9C describes an example of operations for determining utilization parameters for RF parameter optimization and configuring cells with optimized RF parameters according to various embodiments of this disclosure. The operations described with reference to FIG. 9C can be performed as part of a loop performed within a larger, or more general method for cell selection and optimization (for example, operations 920-930 of method 900 in FIG. 9A). In simple terms, FIG. 9B describes operations performed when the spread in load (as expressed by the standard deviation in PRB usage relative to a threshold value) across the cells of S and s is wide enough to justify optimizing RF parameters of all of the cells of S and s, while FIG. 9C describes the opposite situation, where the spread in load (again, as expressed by the standard deviation in PRB usage relative to a threshold value) across the cells of S and s is narrower, and optimizing RF parameters across all of the cells of S and s is not required. In this way, the efficiency and effectiveness of the server as a tool for balancing the load on a wireless network is improved in that, RF parameter optimization can be avoided on cells which do not presently require optimization.

Referring to the non-limiting example of FIG. 9C, here, as in FIG. 9B, at operation 940, the server (for example, server 400 in FIG. 4) or equivalent computing platform (for example, CU 505 in FIG. 5), has selected a target cell s based on current PRB data obtained from cells of the network, and has further selected a set of neighbor cells S of the target cell. According to certain embodiments, the set of neighbor cells S of the target cell are selected based on a neighbor cell list (for example, as described with reference to operation 915 in FIG. 9A). At operation 940, a value of σ(S∪s), where σ(S∪s) comprises a measure of a standard deviation of PRB usage for a union of S and s is calculated and compared against a threshold value for σ. In other words, a determination is made of the variation in load (as expressed in terms of PRB usage) between the target cell s and the cells of the set of neighboring cells S.

In this example, because the value of value of σ(S∪s) is less than the threshold value for σ, the method proceeds to operation 960, at which the server determines the cell of S has the highest PRB usage value. At operation 965, the server selects $\overline{S}$ which is a subset of S, from which the cell determined (for example, at operation 960) to have the highest PRB usage value has been removed. Put simply, at operation 965 the cell of S with the highest current load is excluded from the set of cells which are candidates for optimization, so that the RF parameter optimization can focus shifting the network load to less utilized cells of S.

At operation 970, the server recalculates the standard deviation in PRB usage, only this time for the union of $\overline{S}$ and s, once again comparing the value of the standard deviation against the threshold value for σ. In the case where the value of σ is below the threshold value for σ, the server loops back to operation 960 to identify a cell of ($\overline{S}$∪s) with the highest PRB usage value, and reiterates operations 965 and 970 with a further reduced subset of cells. According to various embodiments, operations 960 through 970 can be looped over multiple iterations until a set of cells comprising s and some subset of S, for which the value of the standard deviation in measured PRB usage values exceeds the specified threshold value.

Referring to the non-limiting example of FIG. 9C, where the determined value of σ($\overline{S}$∪s) (or, if operations 960 through 970 have been iterated more than once, a subset of ($\overline{S}$∪s)) are selected for RF parameter optimization, and the server performs operations (for example, operations 950 and 955 in FIG. 9B) for determining values of at least one utilization parameter, determining CIO and E-Tilt values based on the at least one utilization parameter, and configuring physical layer parameters of the cells selected for RF parameter optimization.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

None of the description in this application should be read as implying that any particular element, step, or function is an essential element that must be included in the claim scope. Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for performing mobility load balancing, the method comprising:
    receiving, at a server, current load data for a plurality of cells of a wireless communication network;
    selecting, by the server, from the plurality of cells, a target cell (s), wherein a value of the current load data for the target cell exceeds a first predefined threshold;
    selecting, by the server, from a neighbor cell list corresponding to the target cell, a set of neighboring cells for the target cell, wherein the selected set of neighboring cells (S) is a subset of the neighbor cell list;
    calculating, by the server, a value of at least one utilization parameter for the target cell for a new load through the target cell, wherein the value of the at least one utilization parameter for the target cell comprises a plurality of values of a physical resource block (PRB) usage of the target cell and the selected set of neighboring cells;
    determining, by the server, a cell individual offset (CIO) value and an electrical tilt (E-tilt) value for the target cell based on the value of the at least one utilization parameter for the target cell, wherein determining the CIO value and the E-tilt value further comprises:
        determining, by the server, information about PRB usage for a union of S and s; and
        determining whether the information about the PRB usage indicates a potentially curable imbalance in a distribution of network load across the cells of S and s; and
    configuring one or more physical layer parameters of the target cell based on the determined CIO and E-tilt values for the target cell.

2. The method of claim 1, wherein the value of the at least one utilization parameter for the target cell comprises a ratio of cell edge user equipment (UE).

3. The method of claim 1, wherein determining the CIO value and the E-tilt value further comprises:
    determining, by the server, a value of σ(S∪s), wherein σ(S∪s) comprises a measure of a standard deviation of the PRB usage for the union of S and s;
    determining that the value of σ(S∪s) indicates the potentially curable imbalance in the distribution of network load across the cells of S and s by determining that the value of σ(S∪s) exceeds a second predetermined threshold; and
    based on the value of σ(S∪s) exceeding the second predetermined threshold:
        determining, by the server, for cells of (S∪s), a value of at least one utilization parameter;
        determining, by the server, for cells of (S∪s), CIO values and E-tilt values based on the value of the at least one utilization parameter; and
        configuring, for cells of (S∪s), one or more physical layer parameters based on the determined CIO and E-tilt values.

4. The method of claim 3, further comprising:
    based on the value of σ(S∪s) being less than the second predetermined threshold, performing an iterative selection loop, performing the iterative selection loop comprising:
        determining a cell of S with a highest value of a PRB metric;
        selecting $\overline{S}$, where $\overline{S}$ is a subset of S from which the cell of S with the highest value of the PRB metric has been removed;
        determining a value of σ($\overline{S}$∪s); and
        based on the value of σ($\overline{S}$∪s) exceeding the second predetermined threshold, selecting the cells of $\overline{S}$ for CIO and E-tilt optimization.

5. The method of claim 4, wherein, based on the value of σ($\overline{S}$∪s) being less than the second predetermined threshold, the iterative selection loop is performed for 5.

6. The method of claim 1, wherein at least one of the CIO value and E-tilt value for the target cell are determined by applying the value of the at least one utilization parameter by using a deep reinforced learning (DRL) model, and further comprising:
    for the target cell and a selected set of neighbor cells, reading observation data from at least one digital unit (DU) and remote radio head (RRH);
    feeding observation data to a neural network to obtain actions;
    determining values of rewards associated with the actions; and
    determining at least one of the CIO value or E-tilt value for the target cell based on an action with a highest reward value.

7. The method of claim 1, wherein determining the CIO value and the E-tilt value further comprises:
    determining whether the information about the PRB usage indicates the potentially curable imbalance in the distribution of network load across the cells of S and s by the information exceeding a second predetermined threshold; and
    performing an iterative selection loop to remove a cell of S, based on the information not exceeding the second predetermined threshold.

8. A server comprising:
    a network interface configured to receive current load data for a plurality of cells of a wireless communication network; and
    a processor operably connected to the network interface, the processor configured to:
        select, from the plurality of cells, a target cell (s), wherein a value of the current load data for the target cell exceeds a first predefined threshold;
        select, from a neighbor cell list corresponding to the target cell, a set of neighboring cells for the target cell, wherein the selected set of neighboring cells (S) is a subset of the neighbor cell list;
        calculate, a value of at least one utilization parameter for the target cell for a new load through the target cell, wherein the value of the at least one utilization parameter for the target cell comprises a plurality of values of a physical resource block (PRB) usage of the target cell and the selected set of neighboring cells;

determine, a cell individual offset (CIO) value and an electrical tilt (E-tilt) value for the target cell based on the value of the at least one utilization parameter for the target cell, wherein to determine the CIO value and the E-tilt value, the processor is further configured to:

determine information about PRB usage for a union of S and s; and determine whether the information about the PRB usage indicates a potentially curable imbalance in a distribution of network load across the cells of S and s; and configure one or more physical layer parameters of the target cell based on the determined CIO and E-tilt values for the target cell.

9. The server of claim 8, wherein the value of the at least one utilization parameter for the target cell comprises a ratio of cell edge user equipment (UE).

10. The server of claim 8, wherein to determine the CIO value and the E-tilt value, the processor is further configured to:

determine a value of σ(S∪s), wherein σ(S∪s) comprises a measure of a standard deviation of the PRB usage for the union of S and s;

determine that the value of σ(S∪s) indicates the potentially curable imbalance in the distribution of network load across the cells of S and s by determining that the value of σ(S∪s) exceeds a second predetermined threshold; and based on the value of σ(S∪s) exceeding the second predetermined threshold:

determine, for cells of (S∪s), a value of at least one utilization parameter;

determine, for cells of (S∪s), CIO values and E-tilt values based on the value of the at least one utilization parameter; and configure, for cells of (S∪s), one or more physical layer parameters based on the determined CIO and E-tilt values.

11. The server of claim 10, wherein the processor is further configured to:

based on the value of σ(S∪s) being less than the second predetermined threshold, perform an iterative selection loop, wherein to perform the iterative selection loop, the processor is further configured to:

determine a cell of S with a highest value of a PRB metric;

select S̄, where S̄ is a subset of S from which the cell of S with the highest value of the PRB metric has been removed;

determine a value of σ(S̄∪s); and based on the value of σ(S̄∪s) exceeding the second predetermined threshold, select the cells of S̄ for CIO and E-tilt optimization.

12. The server of claim 11, wherein, based on the value of σ(S̄∪s) being less than the second predetermined threshold, the iterative selection loop is performed for S̄.

13. The server of claim 8, wherein at least one of the CIO value and E-tilt value for the target cell are determined by applying the value of the at least one utilization parameter by using a deep reinforced learning (DRL) model, and the processor is further configured to:

for the target cell and a selected set of neighbor cells, read observation data from at least one digital unit (DU) and remote radio head (RRH);

feed observation data to a neural network to obtain actions;

determine values of rewards associated with the actions; and determine at least one of the CIO value or E-tilt value for the target cell based on an action with a highest reward value.

14. The server of claim 13, wherein the observation data comprises, PRB usage data, a ratio of edge users and throughput data.

15. A non-transitory computer-readable medium comprising program code, which when executed by a processor of a server, causes the server to:

receive, via a network interface of the server, current load data for a plurality of cells of a wireless communication network;

select, from the plurality of cells, a target cell (s), wherein a value of the current load data for the target cell exceeds a first predefined threshold;

select, from a neighbor cell list corresponding to the target cell, a set of neighboring cells for the target cell, wherein the selected set of neighboring cells (S) is a subset of the neighbor cell list;

calculate, a value of at least one utilization parameter for the target cell for a new load through the target cell, wherein the value of the at least one utilization parameter for the target cell comprises a plurality of values of a physical resource block (PRB) usage of the target cell and the selected set of neighboring cells;

determine, a cell individual offset (CIO) value and an electrical tilt (E-tilt) value for the target cell based on the value of the at least one utilization parameter for the target cell, wherein the program code for determining the CIO value and the E-tilt value comprises program code, which, when executed by the processor, cause the server to:

determine information about PRB usage for a union of S and s; and determine whether the information about the PRB usage indicates a potentially curable imbalance in a distribution of network load across the cells of S and s; and configure one or more physical layer parameters of the target cell based on the determined CIO and E-tilt values for the target cell.

16. The non-transitory computer-readable medium of claim 15, wherein the information about the PRB usage for the union of S and s comprises a measure of a statistic of the PRB usage for the union of S and s; and wherein the value of the at least one utilization parameter for the target cell comprises a ratio of cell edge user equipment (UE).

17. The non-transitory computer-readable medium of claim 15, wherein the program code for determining the CIO value and the E-tilt value comprises program code, which, when executed by the processor, cause the server to:

determine a value of σ(S∪s), wherein σ(S∪s) comprises a measure of a standard deviation of the PRB usage for the union of S and s;

determine that the value of σ(S∪s) indicates the potentially curable imbalance in the distribution of network load across the cells of S and s by determining that the value of σ(S∪s) exceeds a second predetermined threshold; and based on the value of σ(S∪s) exceeding the second predetermined threshold:
  determine, for cells of (S∪s), a value of at least one utilization parameter;
  determine, for cells of (S∪s), CIO values and E-tilt values based on the value of the at least one utilization parameter; and
  configure, for cells of (S∪s), one or more physical layer parameters based on the determined CIO and E-tilt values.

18. The non-transitory computer-readable medium of claim 17, further comprising program code, which when executed by the processor, cause the server to:
  based on the value of σ(S∪s) being less than the second predetermined threshold, perform an iterative selection loop, wherein performing the iterative selection loop comprises:
    determining a cell of S with a highest value of a PRB metric;
    selecting $\bar{S}$, where $\bar{S}$ is a subset of S from which the cell of S with the highest value of the PRB metric has been removed;
    determining a value of σ($\bar{S}$∪s); and
    based on the value of σ($\bar{S}$∪s) exceeding the second predetermined threshold, selecting the cells of $\bar{S}$ for CIO and E-tilt optimization.

19. The non-transitory, computer-readable medium of claim 18,
  wherein based on the value of σ($\bar{S}$∪s) being less than the second predetermined threshold, the iterative selection loop is performed for $\bar{S}$.

20. The non-transitory, computer-readable medium of claim 15, wherein at least one of the CIO value and E-tilt value for the target cell are determined by applying the value of the at least one utilization parameter by using a deep reinforced learning (DRL) model, and further comprising program code, which when executed by the processor, cause the server to:
  for the target cell and a selected set of neighbor cells, read observation data from at least one digital unit (DU) and remote radio head (RRH);
  feed observation data to a neural network to obtain actions;
  determine values of rewards associated with the actions; and
  determine at least one of the CIO value or E-tilt value for the target cell based on an action with a highest reward value.

\* \* \* \* \*